United States Patent
Shin et al.

(10) Patent No.: US 10,164,474 B2
(45) Date of Patent: Dec. 25, 2018

(54) WIRELESS POWER TRANSMITTER AND WIRELESS POWER TRANSMISSION METHOD

(71) Applicant: SAMSUNG ELECTRO-MECHANICS CO., LTD., Suwon-si (KR)

(72) Inventors: Eun Young Shin, Suwon-si (KR); Chang Soo Kang, Suwon-si (KR); Chul Gyun Park, Suwon-si (KR); Jae Suk Sung, Suwon-si (KR); Jae Hyoung Cho, Suwon-si (KR); Sang Ho Cho, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 212 days.

(21) Appl. No.: 15/188,078

(22) Filed: Jun. 21, 2016

(65) Prior Publication Data

US 2017/0033611 A1     Feb. 2, 2017

(30) Foreign Application Priority Data

Jul. 31, 2015    (KR) ........................ 10-2015-0108876

(51) Int. Cl.
| | |
|---|---|
| *H02J 50/12* | (2016.01) |
| *H02J 50/60* | (2016.01) |
| *H02J 50/80* | (2016.01) |
| *H02J 7/02* | (2016.01) |

(52) U.S. Cl.
CPC .............. *H02J 50/12* (2016.02); *H02J 7/025* (2013.01); *H02J 50/60* (2016.02); *H02J 50/80* (2016.02)

(58) Field of Classification Search
CPC .. H02J 7/025; H02J 50/10; H02J 50/12; H02J 50/60; H02J 50/80
USPC .......................................................... 307/104
See application file for complete search history.

(56) References Cited

U.S. PATENT DOCUMENTS

| | | | |
|---|---|---|---|
| 2012/0161535 A1* | 6/2012 | Jung ....................... | H01F 38/14 307/104 |
| 2014/0266036 A1 | 9/2014 | Jung et al. | |

FOREIGN PATENT DOCUMENTS

| | | |
|---|---|---|
| KR | 10-2014-0008581 A | 1/2014 |
| KR | 10-2014-0113147 A | 9/2014 |

\* cited by examiner

*Primary Examiner* — John Poos
(74) *Attorney, Agent, or Firm* — NSIP Law

(57) ABSTRACT

A wireless power transmitter includes a sensor configured to sense an object, a power transmitter configured to wirelessly transmit power to a wireless power receiver, and a controller configured to determine whether the object is the wireless power receiver, and control the power transmitter to wirelessly transmit power to the wireless power receiver upon the object being determined to be the wireless power receiver, wherein the sensor and the power transmitter comprise separate coils.

14 Claims, 4 Drawing Sheets

WIRELESS POWER TRANSMITTER AND WIRELESS POWER TRANSMISSION METHOD

CROSS-REFERENCE TO RELATED APPLICATION

This application claims the benefit under 35 USC § 119(a) of Korean Patent Application No. 10-2015-0108876 filed on Jul. 31, 2015, in the Korean Intellectual Property Office, the entire disclosure of which is incorporated herein by reference for all purposes.

BACKGROUND

1. Field

The following description relates to a wireless power transmitter and a wireless power transmission method.

2. Description of Related Art

In accordance with the development of wireless technology, various wireless functions, ranging from the transmission of data to the transmission of power, have been enabled. Particularly, a wireless power charging technology capable of charging an electronic device with power, even in a non-contact state, has recently been developed. In the field of wireless power charging technology, it is desirable to determine whether a wireless power receiver, i.e., a charging target, has come into proximity with a wireless power transmitter. To this end, according to the related art, a short beacon signal may be transmitted for a predetermined period to determine whether a wireless power receiver has come into proximity with the wireless power transmitter. When it is determined that the wireless power receiver has come into proximity with the wireless power transmitter, the wireless power transmitter transmits power wirelessly.

However, according to the related art, it may be difficult to accurately determine whether or not a new wireless power receiver or a foreign material has come into proximity with the wireless power transmitter, while the wireless power transmitter wirelessly transmits the power to the wireless power receiver.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes a sensor configured to sense an object, a power transmitter configured to wirelessly transmit power to a wireless power receiver, and a controller configured to determine whether the object is the wireless power receiver, and control the power transmitter to wirelessly transmit power to the wireless power receiver upon the object being determined to be the wireless power receiver, wherein the sensor and the power transmitter comprise separate coils.

The power transmitter may be configured to wirelessly transmit the power using a transmitting coil, and the sensor may be configured to sense the object coming into proximity therewith using a sensing coil configured to operate regardless of whether the transmitting coil is operating.

The sensor may be configured to sense the object in proximity therewith, while the power transmitter wirelessly transmits power to the wireless power receiver.

The sensor may be configured to transmit a short beacon signal under control of the controller, and may sense a change in impedance of the short beacon signal to determine whether an object is coming into proximity therewith.

The power transmitter may include a first resonator comprising a transmitting coil, and a first power amplifier configured to provide power to the first resonator. The sensor may include a second resonator comprising a sensing coil, and a detector configured to detect a current or a voltage for the second resonator. The sensor may include a second power amplifier configured to provide power to the second resonator.

The wireless power transmitter may further include a wireless communicator configured to form a local area wireless communications network with the wireless power receiver. In response to the sensor being configured to sense the object, the controller may be configured to use the local area wireless communications network to determine whether the corresponding object is the wireless power receiver.

The sensor may be configured to send a long beacon signal to initiate a wireless communication signal from the wireless power receiver.

In another general aspect, a wireless power transmitter includes a power transmitter comprising a transmitting coil configured to magnetically couple to a receiving coil of a wireless power receiver, a sensor comprising a sensing coil configured to sense an object, and a controller configured to control the power transmitter to wirelessly transmit power to the wireless power receiver, upon the object sensed by the sensor being determined to be the wireless power receiver.

The power transmitter may be configured to supply power to the transmitting coil based on control from the controller, and the transmitting coil may be configured to transmit the power to the receiving coil.

The sensor may be configured to supply the power to the sensing coil according to the controller and to transmit a short beacon signal, and may sense a change in impedance of the transmitted short beacon signal to sense an object. The controller may be configured to control the sensor to transmit the short beacon signal through the sensing coil, and may be configured to maintain transmitting the short beacon signal in response to the transmitting coil wirelessly providing power to the receiving coil.

The sensor may be configured to transmit a short beacon signal with a preset period, and sense a change in impedance of the transmitted short beacon signal to determine an approach of the object.

The wireless power receiver may be coupled to a mobile device.

The sensor may be configured to send a long beacon signal to initiate a wireless communication signal from the wireless power receiver.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
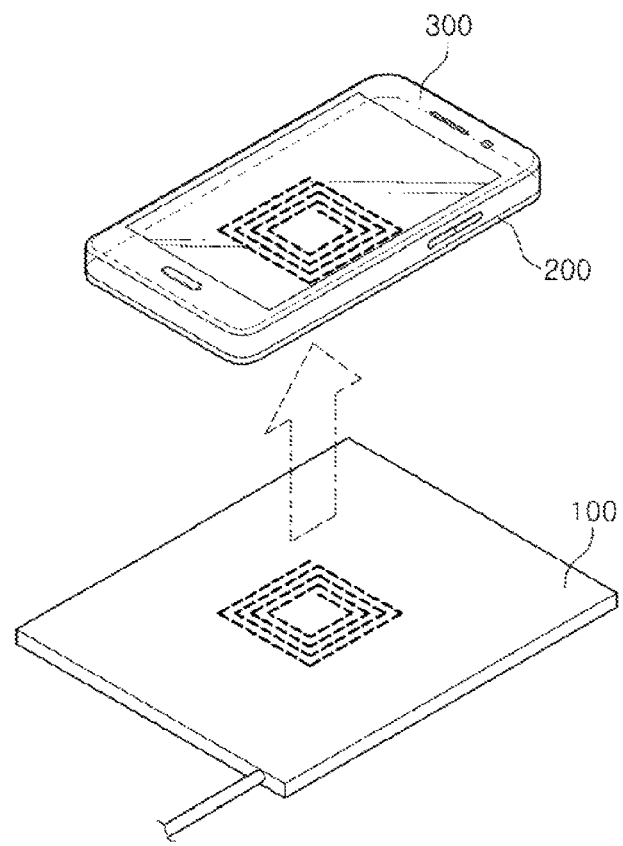
FIG. 1 is a diagram illustrating an example of a wireless power transmitter and a wireless power receiver according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Unless indicated otherwise, a statement that a first layer is "on" a second layer or a substrate is to be interpreted as covering both a case where the first layer directly contacts the second layer or the substrate, and a case where one or more other layers are disposed between the first layer and the second layer or the substrate.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

The terminology used herein is for describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

FIG. 1 is a diagram illustrating an example of a wireless power transmitter and a wireless power receiver according to an embodiment. As illustrated in FIG. 1, a wireless power transmitter 100 wirelessly transmits power to a wireless power receiver 200. The wireless power receiver 200 supplies wirelessly received power to an electronic device 300. For example, the electronic device may be a mobile device such as a smart phone, a laptop, watch, or a tablet PC.

The wireless power transmitter 100 includes a transmitting coil, wherein the transmitting coil magnetically couples to a receiving coil of the wireless power receiver 200 to wirelessly provide the power to the receiving coil. Although the illustrated example illustrates one transmitting coil, it is merely illustrative. For example, the wireless power transmitter 100 may include a plurality of transmitting coils. The wireless power transmitter 100 may include a sensing coil for sensing an external object. The wireless power transmitter 100 may transmit a sensing signal such as a short beacon signal using the sensing coil. That is, since the wireless power transmitter 100 according to an embodiment includes a separate sensing coil transmitting the short beacon signal, the wireless power transmitter 100 may sense the external object coming into proximity with the wireless power transmitter 100 using the sensing coil while wirelessly transmitting the power through the transmitting coil.

Hereinafter, the sensing signal will be described in relation to the short beacon signal by way of example, but may be replaced with other signals according to one or more embodiments.

Hereinafter, various embodiments of the wireless power transmitter 100 will be described with reference to FIGS. 2 and 3.

Figure 2:
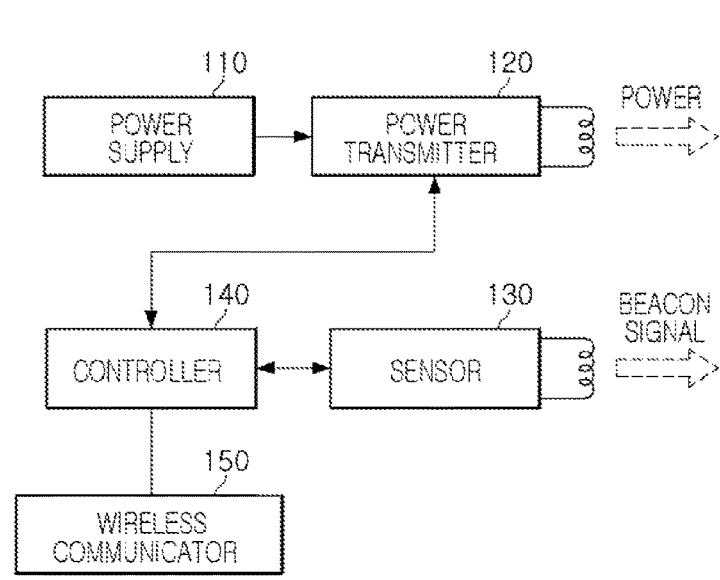
FIG. 2 is a block diagram illustrating the wireless power transmitter according to an embodiment.

FIG. 2 is a block diagram illustrating the wireless power transmitter according to an embodiment. Referring to FIG. 2, the wireless power transmitter 100 includes a power supply 110, a power transmitter 120, a sensor 130, and a controller 140. According to an embodiment, the wireless power transmitter 100 further includes a wireless communicator 150.

The power supply 110 supplies required power to the respective components of the wireless power transmitter 100. For example, the power supply 110 may be a power supplying module that receives alternating current (AC) power and converts the received AC power into various direct current (DC) power signals to supply the converted DC power signals to the respective components of the wireless power transmitter 100.

The power transmitter 120 wirelessly transmits power to the wireless power receiver. The power transmitter 120 includes a power transmitting coil, wherein the power transmitting coil can be magnetically coupled to a receiving coil of the wireless power receiver to wirelessly transmit power to the wireless power receiver.

The sensor 130 senses an object coming into proximity therewith. The sensor 130 includes a sensing coil for sensing the object coming into proximity therewith. Here, the sensing coil may be operated regardless of whether or not the transmitting coil is operated. That is, the sensing coil and the transmitting coil may be operated independently from each other. Therefore, the sensor 130 may sense the object coming into proximity therewith, even when the power transmitter 120 wirelessly transmits power to the wireless power receiver.

The controller 140 controls the short beacon signal transmitted by the sensor 130. The sensor 130 senses a change in impedance of the transmitted short beacon signal to determine whether or not an object is in proximity or coming into proximity therewith.

According to an embodiment, the sensor 130 detects a current or a voltage for the short beacon signal. That is, since the impedance is changed in response to a change in the current or the voltage. The sensor 130 determines whether or not the object is coming into proximity therewith based on the change in the current or the voltage detected for the short beacon signal.

According to an embodiment, the determining of whether or not the object is coming into proximity therewith on the basis of the change in the detected current or voltage may be performed by the controller 140, for example. Accordingly, the controller 140 determines whether or not the object sensed by the sensor 130 is the wireless power receiver. If the sensed object is the wireless power receiver, the controller 140 controls the power transmitter 120 to wirelessly transmit power to the wireless power receiver.

According to an embodiment, the controller 140 controls the sensor 130 to transmit the short beacon signal. That is, the sensor 130 transmits the short beacon signal under control of the controller 140. If the sensor 130 detects a change in the impedance for the short beacon signal, it informs the controller 140 of the detected change in impedance.

According to another embodiment, the sensor 130 transmits the short beacon signal without control from the controller 140. That is, the sensor 130 transmits the short beacon signal according to preset information, detects a change in the impedance for the short beacon signal and informs the controller 140 of the detected change in impedance.

Even when the controller 140 controls the power transmitter 120 to wirelessly provide the power, the controller 140 may control the sensor 130 to transmit the short beacon signal. That is, even when the transmitting coil wirelessly provides the power to the receiving coil, the controller 140 controls the sensor 130 so that the sensing coil transmits the short beacon signal.

The wireless communicator 150 forms a local area wireless communications network with the wireless power receiver. For example, the wireless communicator 160 includes a local area wireless communications module such as a Bluetooth module, or a Zigbee module, for example. The wireless communications module may include an antenna for transmitting and receiving wireless communication signals.

According to an embodiment, when the sensor 130 senses that an object is coming into proximity therewith, the controller 140 determines whether or not the object is the wireless power receiver using the local area wireless communications network. For example, the controller 140 controls the wireless communicator 150 to form a local area wireless communications network with the wireless power receiver, and determines whether or not the object coming into proximity therewith is the wireless power receiver using the formed local area wireless communications network.

According to an embodiment, the controller 140 may control the power transmitter 120 or sensor 130 to transmit a long beacon signal. According to an embodiment, the long beacon signal may also be transmitted by both the power transmitter 120 and the sensor 130. The long beacon signal wakes-up a wireless communicating module of the wireless power receiver. The wireless communicator 150 forms a local area wireless communications network with the wireless communications module of the wireless power receiver which is awakened by the long beacon signal.

Figure 3:
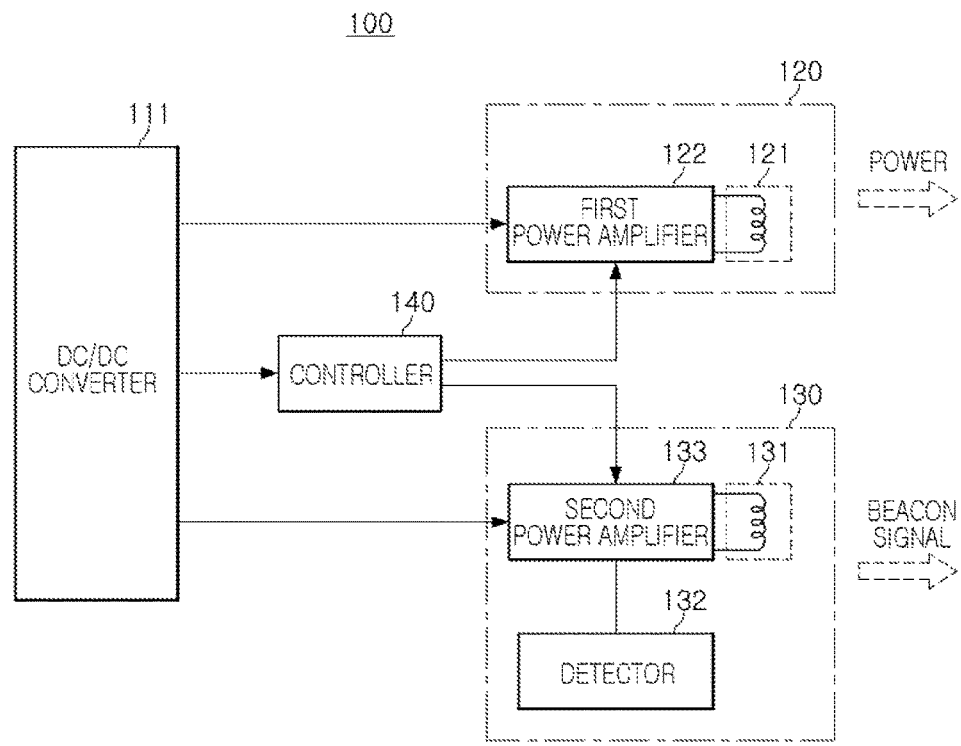
FIG. 3 is a block diagram illustrating a wireless power transmitter according to another exemplary embodiment.

FIG. 3 is a block diagram illustrating a wireless power transmitter according to another embodiment. FIG. 3 illustrates one example of the power transmitter 120 and the sensor 130.

Referring to FIG. 3, a DC/DC converter 111 provides power to other components of the wireless power transmitter 100. In the illustrated example, although only the DC/DC converter 111 is illustrated, a power factor correction circuit may be further included in a front stage of the DC/DC converter 111, as desired.

The power transmitter 120 wirelessly transmits power. The power transmitter 120 includes a first resonator 121 and a first power amplifier 122. The first resonator 121 includes a transmitting coil. The first resonator 121 may be magnetically coupled to a resonance circuit of the wireless power receiver. According to an embodiment, the first resonator 121 may further include at least one capacitor or at least one coil, or both.

The first power amplifier 122 provides the power to the first resonator 121. The first power amplifier 122 is controlled by the controller 140.

The power transmitter 120 may further include an oscillator. An oscillating signal generated by the oscillator may be amplified by the first power amplifier 122 to be supplied to the first resonator 121.

The sensor 130 transmits the short beacon signal. The sensor 130 includes a second resonator 131 and a detector 132. According to an embodiment, the sensor 130 further includes a second power amplifier 133.

The second resonator 131 includes a sensing coil. As described above, the sensing coil may be operated regardless of whether or not the transmitting coil is operated.

The detector 132 detects a change in impedance from a short beacon signal, when the second resonator 131 transmits the short beacon signal. In a case in which other objects are disposed around the wireless power transmitter 100 while the short beacon signal is transmitted, a change in the impedance is caused in the second resonator 131 by the corresponding objects. Therefore, the detector 132 detects whether or not the change in the impedance from the short beacon signal occurs when the second resonator 131 transmits the short beacon signal, and if the change in the impedance occurs, the detector 132 notifies the controller 140 of the change in impedance.

According to an embodiment, the detector 132 monitors a current flowing in the second resonator 131 or a voltage thereof to detect the change in the impedance from the short beacon signal. For example, the detector 132 detects a sensed voltage from a current flowing in the transmitting coil. The controller 140 determines a variation in impedance of the transmitting coil using a variation of the sensed voltage.

According to an embodiment, the detector 132 monitors a current or a voltage output from the second power amplifier 133 to detect the change in the impedance. For example, the detector 132 detects the sensed voltage from an output current of the second power amplifier 133. The controller 140 determines a variation in impedance of the transmitting coil using a variation of the sensed voltage.

The second power amplifier 133 provides the power to the second resonator 131. The second power amplifier 133 is controlled by the controller 140. According to an embodiment, the second power amplifier 133 may receive an oscillating signal from the oscillator.

The controller 140 may include one or more processors. According to an embodiment, the controller 140 may further include a memory 1120. The processor may include, for example, a central processing unit (CPU), a graphics processing unit (GPU), a microprocessor, an application specific integrated circuit (ASIC), or field programmable gate arrays (FPGA), and may have a plurality of cores. The memory may be a volatile memory (e.g., a random access memory (RAM), a non-volatile memory (e.g., a read only memory (ROM), or a flash memory), or a combination thereof.

Figure 4:
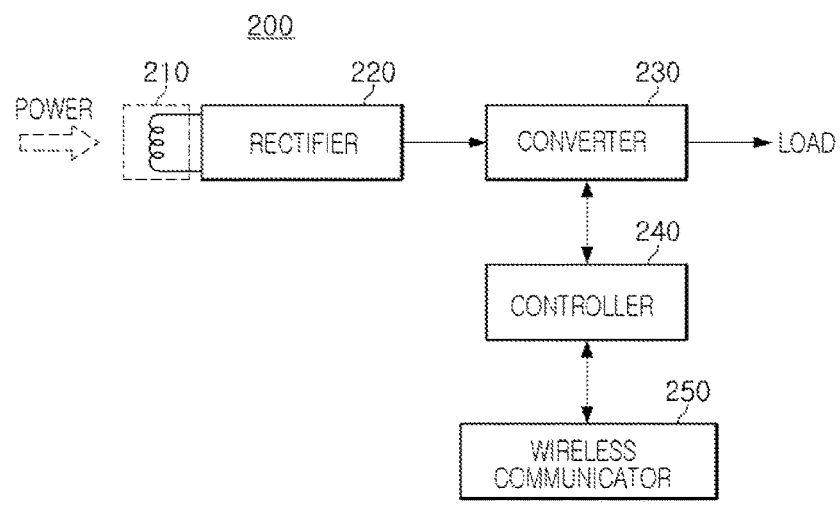
FIG. 4 is a block diagram illustrating a wireless power receiver according to an embodiment.

FIG. 4 is a block diagram illustrating a wireless power receiver according to an embodiment. Referring to FIG. 4, the wireless power receiver 200 includes a power receiving unit 210, a rectifier 220, a converter 230, and a controller 240. According to an embodiment, the wireless power receiver 200 further includes a wireless communicator 250.

The power receiving unit 210 includes a receiving coil. The power received by the receiving coil is rectified by the rectifier 220 and converted by the converter 230 to be provided to a load. The controller 240 controls an operation of the rectifier 220 or the converter 230, or both.

Figure 5A:
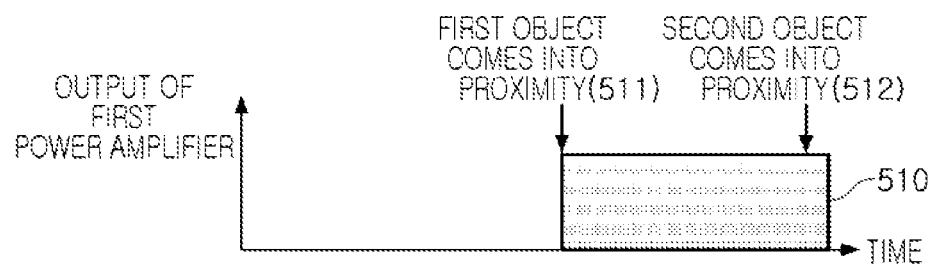
FIGS. 5A through 5C are graphs illustrating outputs of the respective components according to an embodiment.
Figure 5B:
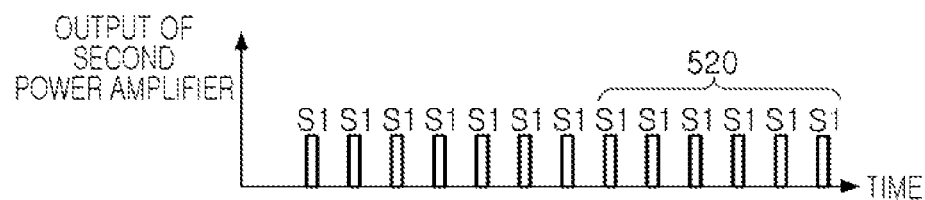
Figure 5C:
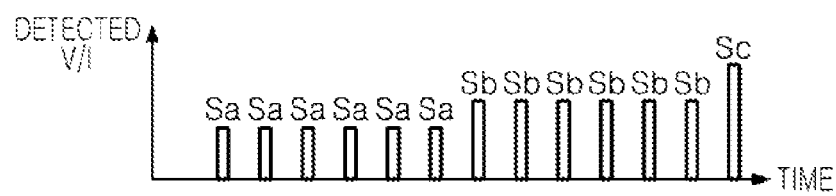

FIGS. 5A through 5C are graphs illustrating outputs of the respective components according to an embodiment in the present disclosure. FIG. 5A illustrates an output of the first power amplifier, that is, an input of the transmitting coil, and FIG. 5B illustrates an output of the second power amplifier. FIG. 5C illustrates a voltage (or current) detected by the detector.

As illustrated in FIGS. 5A through 5C, the second power amplifier periodically transmits the short beacon signal (S1). Before a first object comes into proximity therewith, the output of the detector is uniformly maintained (Sa). When the first object comes into proximity therewith (511), the output (Sb) of the detector changes accordingly. Since the first object maintains a distance with the wireless power transmitter, the output (Sb) of the detector is also maintained.

In a case in which the object coming into proximity therewith is the wireless power receiver, power may be wirelessly transmitted by the first power amplifier (510). Even in a state in which the power is wirelessly transmitted (510), as illustrated in FIG. 5B, the short beacon signal S1 is periodically transmitted (520). A second object may approach (512) while the power is wirelessly transmitted, and impedance of the short beacon signal transmitted by the second power amplifier may be changed by the approach of the second object. As a result, the output of the detector is changed to Sc.

As a result, according to an embodiment, the approach of another object may be accurately determined while the power is wirelessly transmitted. Since the transmitting coil and the sensing coil are used separately in the embodiment, the approach of the object may be accurately determined using the sensing coil while the transmitting coil is operated.

Figure 6A:
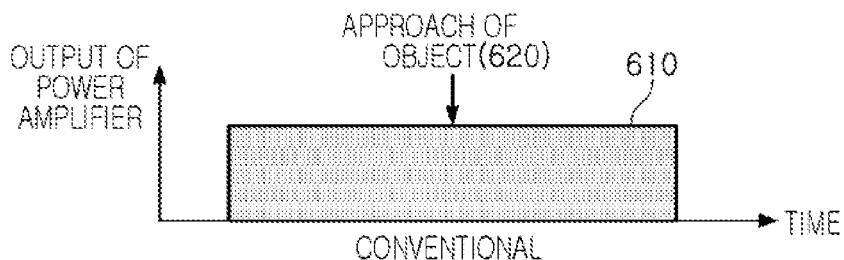
FIGS. 6A and 6B are graphs illustrating outputs of a general wireless power transmitter according to an embodiment.
Figure 6B:
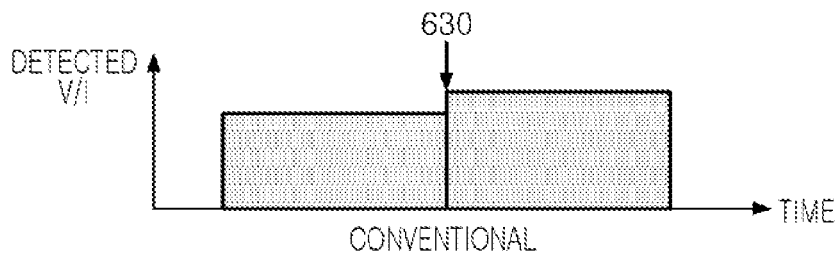

FIGS. 6A and 6B are graphs illustrating outputs of a general wireless power transmitter. The graphs illustrated in FIGS. 6A and 6B illustrate outputs in conventional examples in which the short beacon signal is transmitted using one coil and the power is then wirelessly transmitted.

As illustrated in FIG. 6A, in a case in which the object comes into proximity therewith (620) while the power is wirelessly transmitted (610), some differences may occur (630) in the detected current or voltage. However, since the above-mentioned differences may also occur by a change in power due to a position movement of the wireless power receiver receiving power, or may also be caused by an approach of an external foreign material, the cause of the change may not be accurately determined.

Figure 7:
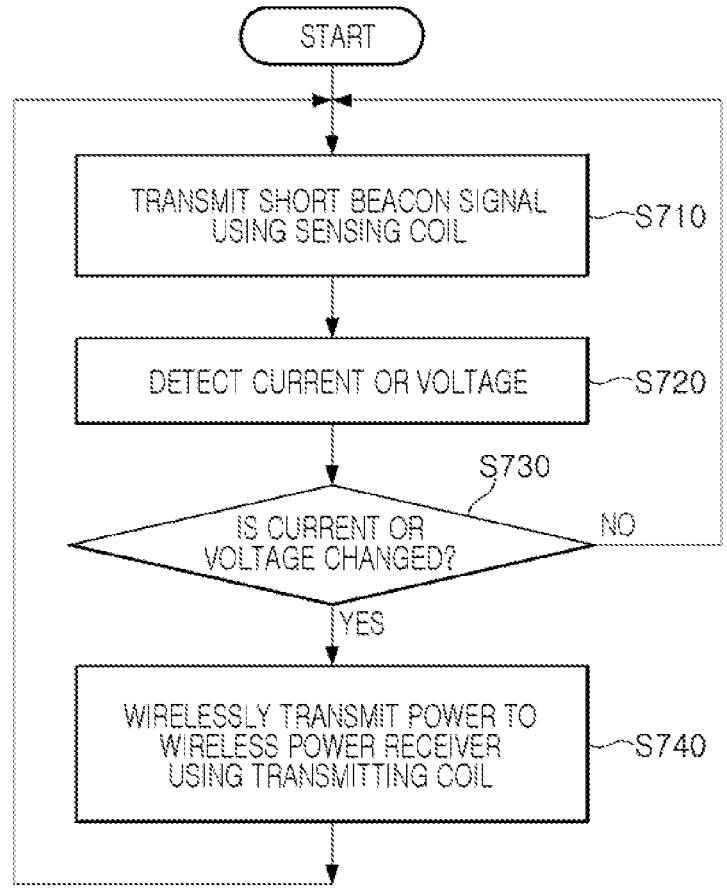
FIG. 7 is a flowchart illustrating an example of a wireless power transmission method according to an embodiment.

FIG. 7 is a flowchart illustrating a wireless power transmitting method according to an embodiment in the present disclosure. Various embodiments of the wireless power transmission method to be described below are performed by the wireless power transmitter described above with reference to FIGS. 1 through 5C.

Referring to FIG. 7, a wireless power transmitter transmits a short beacon signal using a sensing coil (S710). The wireless power transmitter detects a current or a voltage for the short beacon signal (S720). If a change in the current or the voltage is detected (Yes in S730), the wireless power transmitter wirelessly transmits power to a wireless power receiver using a transmitting coil (S740).

According to an embodiment, the wireless power transmitter transmits the short beacon signal using the sensing coil, while wirelessly transmitting power using the transmitting coil. According to an embodiment, the wireless power transmitter transmits the short beacon signal using the sensing coil, regardless of whether or not the transmitting coil is operated.

If the change in the current or the voltage is not detected (No in S730), the wireless power transmitter continuously transmits the short beacon signal (S710).

As set forth above, according to the embodiments in the present disclosure, the wireless power transmitter may accurately determine the approach of the external object even while wireless charging is performed.

The apparatuses, units, modules, devices, and other components illustrated in FIGS. 1-5C that perform the operations described herein with respect to FIGS. 5A-7 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 5A-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5A-7 that perform the operations described herein with respect to FIGS. 5A-7 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal, device, unit, and receiver as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a sensor configured to sense an object;
   a power transmitter configured to wirelessly transmit power to a wireless power receiver; and
   a controller configured to determine whether the object is the wireless power receiver, and control the power transmitter to wirelessly transmit power to the wireless power receiver upon the object being determined to be the wireless power receiver,
   wherein the sensor and the power transmitter comprise separate coils, and
   wherein the sensor is configured to transmit a short beacon signal under control of the controller, and sense a change in impedance from the short beacon signal to determine whether an object is coming into proximity therewith.

2. The wireless power transmitter of claim 1, wherein the power transmitter is configured to wirelessly transmit the power using a transmitting coil, and
   the sensor is configured to sense the object coming into proximity therewith using a sensing coil configured to operate regardless of whether the transmitting coil is operating.

3. The wireless power transmitter of claim 1, wherein the sensor is configured to sense the object in proximity therewith, while the power transmitter wirelessly transmits power to the wireless power receiver.

4. The wireless power transmitter of claim 1, wherein the power transmitter comprises:
   a first resonator comprising a transmitting coil; and
   a first power amplifier configured to provide power to the first resonator.

5. The wireless power transmitter of claim 4, wherein the sensor comprises:
   a second resonator comprising a sensing coil; and
   a detector configured to detect a current or a voltage for the second resonator.

6. The wireless power transmitter of claim 5, wherein the sensor includes a second power amplifier configured to provide power to the second resonator.

7. The wireless power transmitter of claim 1, further comprising:
   a wireless communicator configured to form a local area wireless communications network with the wireless power receiver,
   wherein in response to the sensor being configured to sense the object, the controller is configured to use the local area wireless communications network to determine whether the corresponding object is the wireless power receiver.

8. The wireless power transmitter of claim 1, wherein the sensor is configured to send a long beacon signal to initiate a wireless communication signal from the wireless power receiver.

9. A wireless power transmitter comprising:
   a power transmitter comprising a transmitting coil configured to magnetically couple to a receiving coil of a wireless power receiver;
   a sensor comprising a sensing coil configured to sense an object; and
   a controller configured to control the power transmitter to wirelessly transmit power to the wireless power receiver, upon the object sensed by the sensor being determined to be the wireless power receiver,
   wherein the sensor is configures to supply the power to the sensing coil according to the controller and to transmit a short beacon signal, and sense a change in impedance from the transmitted short beacon signal to sense and object.

10. The wireless power transmitter of claim 9, wherein the power transmitter is configured to supply power to the transmitting coil based on control from the controller, and the transmitting coil is configured to transmit the power to the receiving coil.

11. The wireless power transmitter of claim 9, wherein the controller is configured to control the sensor to transmit the short beacon signal through the sensing coil, and is configured to maintain transmitting the short beacon signal in response to the transmitting coil wirelessly providing power to the receiving coil.

12. A wireless power transmitter comprising:
   a power transmitter comprising a transmitting coil configured to magnetically couple a receiving coil of a wireless receiver;
   a sensor comprising a sensing coil configured to sense an object; and
   a controller configured to control the power transmitter to wirelessly transmit power to the wireless power receiver, upon the object sensed by the sensor being determined to be the wireless power receiver,
   wherein the sensor is configured to transmit a short beacon signal with a preset period, and sense a change in impedance of the transmitted short beacon signal to determine an approach of the object.

13. The wireless power transmitter of claim 12 wherein the wireless power receiver is coupled to a mobile device.

14. The wireless power transmitter of claim 9, wherein the sensor is configured to send a long beacon signal to initiate a wireless communication signal from the wireless power receiver.

* * * * *